United States Patent [19]

Galli et al.

[11] Patent Number: 4,838,895
[45] Date of Patent: Jun. 13, 1989

[54] PROCESS FOR THE PREPARATION OF CONCENTRATED AQUEOUS DYE FORMULATIONS BY DESALINATION AND CONCENTRATION BY MEMBRANE SEPARATION IN PRESENCE OF SODIUM SALT

[75] Inventors: Roberto Galli; Petr Kvita, both of Reinach, Switzerland

[73] Assignee: Ciba-Geigy Corporation, Ardsley, N.Y.

[21] Appl. No.: 179,350

[22] Filed: Apr. 8, 1988

[30] Foreign Application Priority Data

Apr. 16, 1987 [CH] Switzerland .................. 1506/87

[51] Int. Cl.$^4$ .................. C09B 67/26; D06L 3/12
[52] U.S. Cl. .................. 8/527; 8/436; 8/549; 8/618; 8/680; 8/681; 8/688
[58] Field of Search .................. 8/527, 68 D

[56] References Cited

U.S. PATENT DOCUMENTS

| | | | |
|---|---|---|---|
| 4,329,145 | 5/1982 | Koll et al. | 8/527 |
| 4,402,701 | 9/1983 | Gleinig et al. | 8/436 |
| 4,452,608 | 6/1984 | Erzinger | 8/524 |
| 4,523,924 | 6/1985 | Lacroix | 8/527 |
| 4,648,883 | 3/1987 | Podder | 8/527 |
| 4,689,048 | 8/1987 | Fortsch et al. | 8/524 |
| 4,702,744 | 10/1987 | Wolff et al. | 8/527 |

FOREIGN PATENT DOCUMENTS

| | | |
|---|---|---|
| 1359898 | 7/1974 | United Kingdom . |
| 1441585 | 7/1976 | United Kingdom . |
| 2015018 | 9/1979 | United Kingdom . |

Primary Examiner—A. Lionel Clingman
Attorney, Agent, or Firm—Kevin T. Mansfield; Edward McC. Roberts

[57] ABSTRACT

Concentrated aqueous dye formulations of anionic dyes are prepared from the corresponding crude dye solutions or suspensions, in which the anionic dyes are present as potassium, sodium/potassium or ammonium/potassium mixed salts, by desalinating and concentrating the solutions or suspensions by means of a membrane separation process. Sodium salts of mineral acids or lower organic carboxylic acids are added before or during this process in order to improve the solubility of the dyes and thus the stability of the dye formulations.

9 Claims, No Drawings

PROCESS FOR THE PREPARATION OF CONCENTRATED AQUEOUS DYE FORMULATIONS BY DESALINATION AND CONCENTRATION BY MEMBRANE SEPARATION IN PRESENCE OF SODIUM SALT

The present invention relates to a process for the preparation of concentrated aqueous dye formulations of anionic dyes by substantially freeing crude dye solutions or suspensions in which the dyes are present as relatively sparingly soluble dye salts, from the inorganic salts also present by means of a membrane separation process, preparing more readily soluble dye salts by addition of sodium salts and concentrating the dye solutions.

A process for the preparation of concentrated aqueous dye or brightener solutions in which on the one hand inorganic salts are removed from the corresponding synthesis solutions by means of a membrane separation process and on the other hand the dyes or brighteners present as sodium, potassium or alkaline earth metal salts are converted into lithium or ammonium salts is already known from DE-A-2,805,891.

It has now been found that stable concentrated aqueous dye formulations of anionic dyes, in particular of anionic reactive dyes, can be obtained if crude dye solutions or suspensions of these dyes, in which the dyes are essentially present as potassium salts or sodium/potassium mixed salts and which contain a relatively high proportion of inorganic salts as a result of the synthesis, are substantially freed from the inorganic salts by means of a membrane separation process and the dye salts are converted into different salts by addition of sodium salts before and/or during the membrane separation process, that is to say are converted into the more readily soluble sodium salts of the dyes.

These dye solutions are then concentrated to give, if appropriate after addition of customary additives, the dye formulations according to the invention.

The present invention thus relates to a process for the preparation of concentrated aqueous dye formulations of anionic dyes, which comprises adding sodium salts of mineral acids or lower organic carboxylic acids and optionally other customary additives to aqueous crude dye solutions or suspensions which contain inorganic salts and in which the anionic dyes are present, for example, as potassium, sodium/potassium or ammonium/potassium mixed salts, and desalinating and concentrating the solutions or suspensions by means of a membrane separation process.

The present invention also relates to the concentrated aqueous dye formulations obtained by the process according to the invention and their use for dyeing and printing natural or synthetic fibre materials, in particular textile fibre materials, and furthermore paper or leather.

Inorganic salts (or electrolytes) are understood as those which originate from the neutralization and/or salting out of the dye from the synthesis and are carried into the synthesis solution or suspension, high as alkali metal or alkaline earth metal salts, for example magnesium chloride, sulfate or hydrogen sulfate, sodium chloride, sulfate or hydrogen sulfate or potassium chloride, sulfate or hydrogen sulfate, above all sodium chloride and potassium chloride, and furthermore also ammonium salts.

The anionic dyes can be present in the crude dye solutions or suspensions, such as are used according to the invention, in the form of potassium, sodium/potassium or ammonium/potassium mixed salts (dye salts).

Possible anionic dyes which can be used according to the invention are organic dyes, for example acid (Colour Index (C.I.) acid and direct dyes) dyes, such as metal complex, chrome, developing and mordant dyes, and in particular anionic reactive dyes. These are, in particular, the following metal-free or metal-containing and metallizable dyes containing sulfonic acid or carboxylic acid groups: mono-, dis- and polyazo dyes, and furthermore pyrazolone, thioxanthone, oxazine, stilbene, formazan, anthraquinone, nitro, methine, triphenylmethane, xanthone, naphthazarine, styryl, azastyryl, naphthoperinone, quinophthalone and phthalocyanine dyes, and, preferably, those dyes which contain at least one fibre-reactive radical in the dye molecule.

The anionic dyes processed to dye formulations by the present process are the potassium or sodium/potassium or ammonium/potassium mixed salts of, in particular, acid wool dyes, reactive dyes or direct cotton or paper dyes of the azo, anthraquinone and phthalocyanine series. Possible azo dyes are, for example, metal-containing or metal-free mono-and disazo dyes and formazan dyes which contain one or more sulfonic acid groups. Anthraquinone dyes which may be mentioned are, in particular, 1-amino-4-arylamino-anthraquinone-2-sulfonic acids, and phthalocyanine dyes which may be mentioned are, in particular, sulfated copper phthalocyanines or nickel phthalocyanines or phthalocyaninearlyamides.

Possible metal complex dyes are the salts mentioned of metal complex dyes containing sulfonic acid or carboxylic acid groups, for example 1:1 or 1:2 metal complexes of azo or azomethine dyes or metallized phthalocyanines, in particular copper phthalocyanines and nickel phthalocyanines. The 1:1 and 1:2 metal complexes are preferably 1:1 nickel complexes, 1:1 cobalt complexes, 1:1 copper complexes, 1:1 chromium complexes, 1:1 iron complexes or symmetric or asymmetric 1:2 cobalt complexes, 1:2 iron complexes or 1:2 chromium complexes of, in particular, o-carboxy-o-hydroxy-, o-hydroxy-o'-amino- or o,o'-di-hydroxyazo dyes of the benzene-azo-benzene, naphthalene-azo-naphthalene, benzene-azo-naphthalene, benzene-azo-pyrazolone, benzene-azo-pyridone or benzene-azo-acetoacetamide type, it being possible for these groupings to be unsubstituted or substituted. Possible substituents are, for examaple: unsubstituted or substituted sulfonic acid amides or sulfones, halogen or nitro.

The copper phthalocyanines and nickel phthalocyanines are derived from the customary mixtures of various degrees of sulfonation and preferably contain 2 to 3 or even 4 sulfated sulfonic acid α- or γ-hydroxy-alkylamide groups, and in addition can also contain individual halogens and individual sulfonic acid amide groups, it being possible for these sulfonic acid amide groups to be unsubstituted or substituted on the nitrogen, for example by lower alkyl, such as methyl, ethyl, propyl or butyl, or lower hydroxyalkyl groups, such as 2-hydroxyethyl, 2-hydroxypropyl or 3-hydroxypropyl.

The reactive dyes contain as suitable fibre-reactive groups, for example, heterocyclic groups or an acyl group of a carboxylic acid, these groups having at least one halogen atom detachable under dyeing conditions. They are, for example, the following groups: s-triazinyl radicals which carry one or two halogen atoms, such as chlorine, fluorine or bromine atoms, on the triazine ring, pyrimidyl radicals which carry one to three halogen atoms, such as chlorine and/or fluorine atoms, or one or two arylsulfonyl or alkanesulfonyl groups on the pyrimidine ring, dichloroquinoxalinyl or 2-chlorobenzothiazolyl groups or the acyl radicals of halogen-containing aliphatic carboxylic acids or unsaturated carboxylic acids, such as the chloroacetyl radical or the acyl radical or acrylic acid, or the radicals of β-bromopropionic acid and α,β-dibromopropionic acid. The reactive dyes can contain, for example, 1 to 4, preferably 1 or 2, fibre-reactive groups, it being possible for these to be identical to or different from one another.

Examples of fibre-reactive groups of the vinylsulfone series are, in addition to the vinylsulfonyl group itself, aliphatic sulfone groups which contain a group which can be eliminated under alkaline conditions, such as a halogen atom or an ester radical of an acid, in the α-position relative to the sulfone group, such as, for example, the α-chloroethylsulfonyl, α-acetoxyethylsulfonyl, α-(3-sulfobenzoyloxy)-ethylsulfonyl, α-sulfatoethylsulfonyl, α-thiosulfatoethylsulfonyl, α-phosphatoethylsulfonyl, α-sulfatoethylsulfonylmethylamino, vinylsulfonylmethylamino, 4-vinylsulfonylbutyryl, 4-chloroethylsulfonylbutyryl, vinylsulfonylethoxyethylamino or the 4-α-sulfatoethylsulfonylanilino group.

Further possible fibre-reactive groups are moreover, for example: halogenocyclobutane and mono- or bis-(α-halogeno-α-hydroxypropyl)-amino groups, α-halogenoethylsulfamide radicals, α-halogenoethoxy groups, α-halogenoethylmercapto groups, α-halogeno-α-hydroxy-propylsulfamide radicals or 2,3-epoxypropyl groups.

Optionally, the dyes can also be present as mixtures with one another or optionally with dyes of a different type.

The term anionic dyes in the present case is also to be understood as meaning fluorescent brighteners, and in particular especially stilbene brighteners, in particular those of the bistriazinylaminostilbenedisulfonic acid, bis-styrylbiphenyl and -benzene and bis-triazolylstilbene-disulfonic acid type. The brighteners containing sulfo groups are present in the form of metal salts (for example potassium salts or potassium/ammonium or sodium/potassium mixed salts), such as are obtained in the synthesis.

Stilbene brighteners containing sulfo groups which are preferably processed with the aid of the process according to the invention are those of the formula

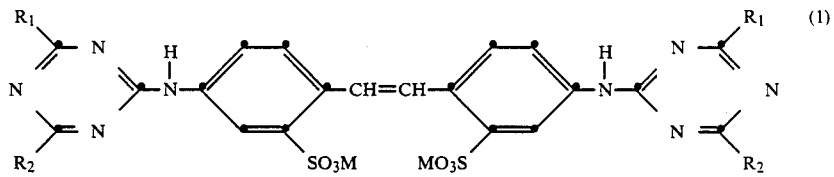

in which M is potassium or sodium and postassium and $R_1$ and $R_2$ independently of one another are $-NH_2$, $-NHCH_3$, $-NHC_2H_5$, $-N(CH_3)_2$, $-N(C_2H_5)_2$, $-NHCH_2CH_2OH$, $-NHCH_2CH_2CH_2OH$, $-N(CH_2CH_2OH)_2$, $-N(CH_2CH_2CH_2OH)_2$, $-N(CH_3)(CH_2CH_2OH)$, $-NHCH_2CH_2OCH_2CH_2OH$, $-NHCH_2CH_2CH_2SO_3M$, $-OH$, $-OCH_3$, $-OCH(CH_3)_2$, $-OCH_2CH_2OCH_3$,

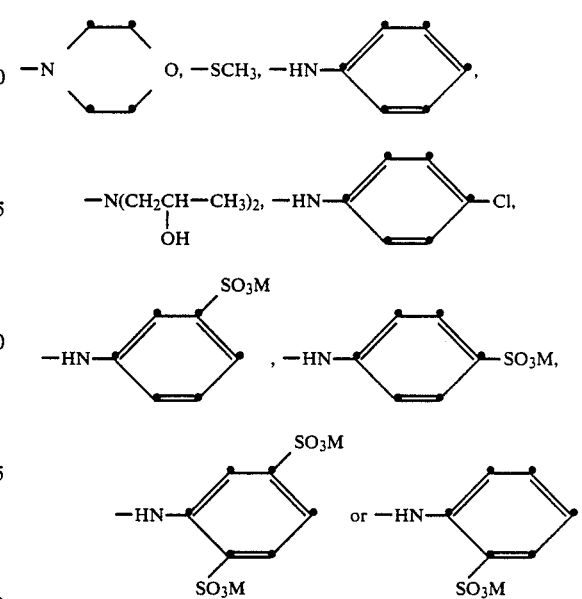

is which M is as defined above; or of the formula

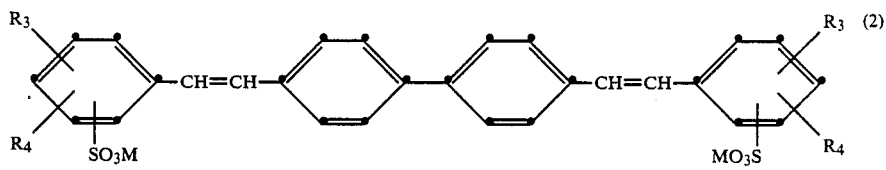

in which $R_3$ is hydrogen, alkyl with 1 to 4 carbon atoms, alkoxy with 1 to 4 carbon atoms, halogen or $SO_3M$, $R_4$ is hydrogen or alkyl with 1 to 4 carbon atoms and M is as defined above; and furthermore of the formula

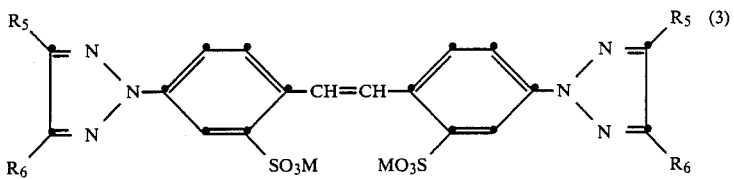

(3)

in which M is as defined above and $R_5$ and $R_6$ independently of one another are hydrogen, $CH_3$, or $R_5$ and $R_6$ together make up a benzene ring.

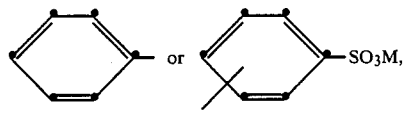

The dyes or fluorescent brighteners are prepared by known continuous or discontinuous processes and are obtained at the end of the synthesis, depending on the process procedure and the solubility properties, in the form of a synthesis solution or synthesis suspension.

Suitable membrane separation processes for the process according to the invention are
— dialysis over a concentration gradient on ion-selective membranes, or
— electrodialysis by applying an electrical voltage and using ion exchanger membranes as diaphragms, and in particular
— ultrafiltration and
— reverse osmosis.

Ultrafiltration and reverse osmosis are as a rule carried out with fine-pored membranes with pore diameters of about 0.1 to 1,000 nm.

The pore diameters for reverse osmosis (hyperfiltration) membranes are in the lower part of this range, that is to say essentially in the range from 0.1 to 50 nm, preferably in the range from 0.1 to 10 nm.

The ultrafiltration can be carried out either under pressure or by applying a vacuum. It is furthermore possible to apply pressure on the dye solution side and at the same time a vacuum on the permeate side. The process is generally carried out under a pressure of 0.5 to 10 bar or a vacuum of 200 to 20 mbar. The ultrafiltration can advantageously be carried out by applying a vacuum, since s reduced pressure counteracts blocking of the membrane on the permeate side and significantly increases the membrane flux.

The hyperfiltration is a molecular separation method which is carried out using semipermeable membranes with a cut-off level in the molecular weight range from 300 to 1,000, preferably 400 to 800. Such membranes allow through water and dissolved substances, which are below the separation limit because of their molecular weight, under a low to moderate pressure. Pressures of 10 to 100 bar, preferably 10 to 40 bar and in particular 10 to 30 bar, are generally used.

The membranes which are preferably used in the process according to the invention because of their good separation properties consist of a polymeric organic material, which may be modified on the surface by acid or basic groups.

The polymeric membrane materials are naturally occurring, semi-synthetic or synthetic materials, which can contain reactive groups, for example hydroxyl, amino and/or amidoxime groups. Such materials—if they are to be chemically modified— can be reacted with suitable reagents which on the one hand contain acid or basic (ionic) groups and on the other hand contain at least one grouping which can react to form a chemical (covalent) bond.

The acid groups are, in particular, carboxyl and sulfonyl groups, and the basic groups are primary, secondary or tertiary amino groups, and furthermore phosphonium or sulfonium groups.

The following membrane-forming polymers, for example, can be used to prepare membranes:
— cellulose acetates, for example those with a low acetyl group content, but also cellulose with a higher content of acyl groups, for example so-called two-and-a-half acetate, or
— polyvinyl alcohols,
— polyacrylonitrile and copolymers of acrylonitrile and other ethylenically unsaturated monomers,
— polysulfones,
— polystyrenes,
— polyamides or
— polyimides.

Appropriate mixtures of these polymers are also suitable.

Those polymers which are chemically modified as described before and/or after the membrane formation are preferably used.

Possible reactive reagents which contain an acid or basic group are colourless reagents, for example sulfonating reagents, such as chlorosulfonic acid, and coloured compounds, in particular acid reactive dyes, which can belong to various classes, such as anthraquinone, azo and formazan dyes. Optionally they can also be in the form of metal complexes.

Semipermeable membranes with pore diameters of 0.1 to 50 nm and a cutoff level in the molecular weight range from 300 to 1,000, preferably 400 to 800, are particularly suitable. These are essentially anionically modified cellulose acetate, polyacrylonitrile, polystyrene, polyvinyl alcohol and, in particular, polysulfone membranes. (cf. U.S. Pat. Nos. 4,247,401, 4,604,204, 4,477,634, 4,584,103, 4,690,765, 4,690,766, EP-A-47,953 and EP-A-82,355).

The crude dye solutions or suspensions used according to the invention as a rule have a dye content of 5 to 20% by weight and a salt content of 0.05 to 15% by weight, in particular 1 to 5% by weight. They can be obtained from dye synthesis suspensions by dilution with water or from dye press-cakes by suspending in deionized water or dilute aqueous sodium hydroxide solutions. The dye press-cake is obtained, for example, by salting out dye synthesis solutions or suspensions and separating off/filtering off the dyes over, for example, pressing filters. Insoluble constituents can be removed by microfiltration. The desalination, salt conversion and concentration and carried out until a dye content of 10 to 50% by weight is reached. The salt content (inorganic salts) of the dye formulations thus treated is in the range from about 0.05 to 5% by weight, a salt content in the range from 0.1 to 1% by weight preferably being achieved.

The crude dye solutions are used according to the invention can have temperatures in the range from 10° to 80° C., preferably 20° to 60° C. The process is as a rule carried out at room temperature. The pH values of the solutions can be in the range from 4 to 10, preferably 5 to 9. Suitable membranes are available for the entire temperature and pH range.

Possible sodium salts are sodium halides, for example sodium bromide and sodium iodide, but in particular sodium chloride. Other inorganic sodium salts which are suitable are sodium carbonates, sulfates and phosphates, the acid and neutral salts being mentioned; and furthermore also polyphosphates, for example sodium tripolyphosphate. Suitable organic sodium salts are those of lower organic carboxylic acids with, for example, 1 to 5 carbon atoms, for example sodium formate, sodium acetate, sodium lactate or sodium oxalate.

Sodium chloride is preferably used, and in particular it is added to the crude dye solution or emulsion is amounts of 5 to 200% by weight, preferably 15 to 70% by weight, based on the weight of the dye, before or during the membrane separation process. The salts are as a rule used as aqueous solutions. Sodium chloride is usually added in an amount such that a stoichiometric excess of sodium ions, based on the dye anions, is present. The procedure according to which the membrane separation process is carried out in stages, i.e. the crude dye solution is passed over the membrane several times, an increasing degree of desalination being reached, and sodium chloride is added after the first stage and optionally also after further stages, is especially preferred. Salt mixtures can also be used.

It is possible to add, for example, solubilizing agents, such as glycols or glycol ethers, caprolactam, trimethylolethane or pentaerythritol, anionic or nonionic surface-active compounds (surfactants) or other customary additives, such as urea, glucose or dextrin, to the crude dye solutions to optimize the membrane separation process. The process is to be carried out so that these additives are not completely removed again from the dye solution during the membrane separation process. Optionally, removed components can be added again after the individual stages of the membrane separation process. These additives are as a rule used in amounts of 0.1 to 30% by weight, preferably 1 to 20% by weight, based on the weight of the dye.

An increase in the flow rate, for example, can thus be achieved and membrane blockages are avoided, that is to say overall a greater efficiency of the process is achieved.

Examples of possible surface-active compounds which can be used according to the invention are: dispersants and wetting or dispersing agents of an anionic, cationic or nonionic nature, such as sodium dioctylsulfosuccinate, dibutylnaphthalene sulfonate, dodecylbenzenesulfonate, laurylpyridinium chloride, alkylphenyl polyglycol ethers, stearyl-diphenyloxyethyldiethylenetriamine and ethylene oxide addition products.

Preferred anionic surfactants are condensation products of aromatic sulfonic acids with formaldehyde, such as condensation products of formaldehyde, naphthalenesulfonic acid and benzenesulfonic acid, or condensation products of crude cresol, formaldehyde and naphthalenesulfonic acid, and above all condensation products of phenol-, cresol-or naphthosulfonic acid and formaldehyde or ligninsulfonates (sulfitecellulose waste liquor) or oxyligninsulfonates, and in particular condensation products of naphthalenesulfonic acid and formaldehyde, these preferably being present at alkali metal and/or ammonium salts.

Possible nonionic surface-active compounds which can be used according to the invention are: polyethylene glycols with a molecular weight of preferably 200 to 1,000; copolymers of ethylene oxide and propylene oxide (so-called block polymers); reaction products of fatty acids with 8 to 22 carbon atoms and amines or hydroxyalkylamines; and addition products of, for example, 5 to 80 mol, preferably 10 to 30 mol, of alkylene oxides, in particular ethylene oxide, it being possible for individual ethylene oxide units to be replaced by substituted epoxides, such as styrene oxide and/or propylene oxide, and saturated or unsaturated alcohols, mercaptans or amines with 8 to 22 carbon atoms or alkylphenols or alkylthiophenols, the alkyl radical of which has at least 7 carbon atoms, for example fatty alcohol polyglycol ethers.

In the context of a rational procedure, it is particularly advantageous to carry out the dye synthesis and the subsequent membrane treatment continuously.

The dye formulations obtained according to the invention, which are distinguished by their high concentration of dye, their homogeneity and their good stability over a period of several months and in a wide temperature range (0°–50° C.), can then be converted into liquid and solid dye formulations for commercial use.

To prepare a liquid form for commercial use, the concentrated aqueous dye formulations has only to be brought to a given final dye content by dilution and/or with the aid of extenders, optionally after addition of the components customary for liquid formulations, such as foam-suppressing agents, antifreeze agents, humectants, surfactants, buffer substances and/or antimicrobial agents, and adjusting the pH. However, the dye formulation can also be converted into a solid dye product by removal of water, optionally after addition of additives, such as binders, dust removal agents, wetting agents, buffer substances and/or extenders. As a result of the increased dye concentration, less energy is needed for drying. The customary drying processes, in particular spray-drying, are used.

The auxiliaries or additives mentioned can of course not only be added to the dye solution before its final formulation, but they can as already mentioned be introduced into the solution of the crude dye before or during the process, and are thus at least in part already present in the dye solution from which the final dye formulation for commercial use is prepared (for example solubilizing agents, solvents, surfactants and the like). Addition during the process is of course only appropriate if the auxiliary or auxiliaries is or are not removed completely from the solution again by the membrane separation process.

The liquid formulations for commercial use and the solid dye products are used to prepare dyebaths, padding liquors or printing pastes, which are suitable, depending on the dyes, for dyeing and printing naturally occurring or synthetic fibre materials, for example textile fibre materials of cotton, wool, silk, polyacrylonitrile or polyamide, or such materials of fibre blends, for example of wool/polyamide, and furthermore also for dyeing and printing leather or paper.

The following examples serve to illustrate the invention; parts are parts by weight and percentage are percentages by weight. The membrane flux is stated in litres of permeate per m² of membrane area and day (1/m²xd).

EXAMPLE 1

1 kg of press-cake of an anionic dyestuff, in potassium and sodium salt form, of the formula

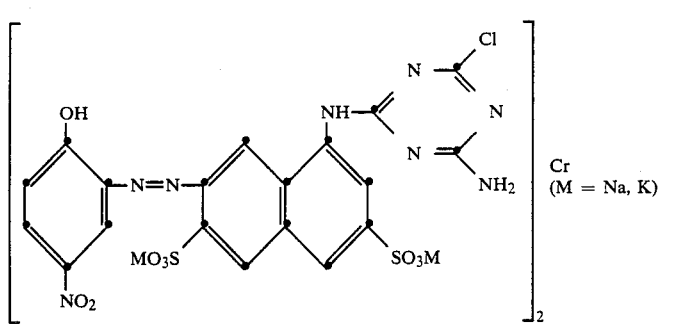
(101)

is dissolved in 80 ml of 1N sodium hydroxide solution and 7.5 l of deionized water, with stirring. A dye solution with a dry solids content of 7.4% (NaCl/KCl content: 1.2%) and a pH of 9 is obtained.

The solution is subjected to diafiltration on a reverse osmosis unit (0.655 m² area) containing chemically modified polyacrylonitrile membranes with an exclusion limit of about 500 (cf. Example 1 of U.S. Pat. No. 4,584,103) with 11 l of deionized water until the salt content of the dye solution is about 0.1%. Membrane flow (flux): 380 l/m²xd. Duration of the diafiltration: 28 hours.

1 l of 30% aqueous sodium chloride solution which additionally also contains 16 g of a block polymer of ethylene oxide and propylene oxide is then added to the dye solution and the dye solution is subjected to diafiltration again with a further 16 l of deionized water. The salt content of the resulting dye solution is less than 0.1%. The dye solution is then concentrated to a dry solids content of 24%.

This concentrated solution can be converted into a formulation for commercial use, for example by adding buffer substances, such as sodium tripolyphosphate, and then adjusting the formulation to the desired concentration by addition of water.

Storage-stable concentrated dye formulations can be prepared in an analogous manner with similarly good results from press-cakes of the mono-, di- or tri-reactive dyes of the following formulae (M = Na, K):

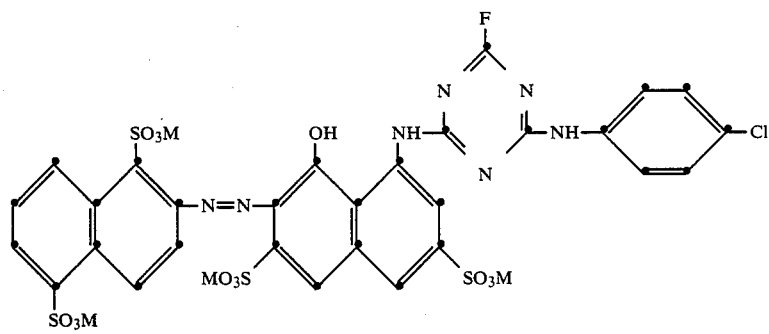
(102)

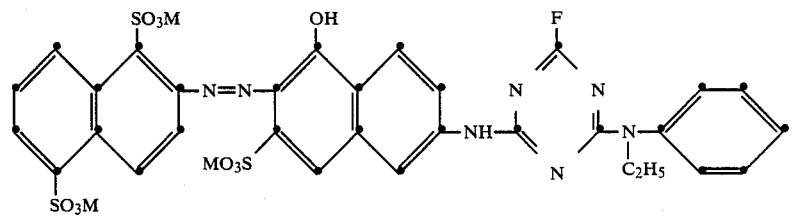
(103)

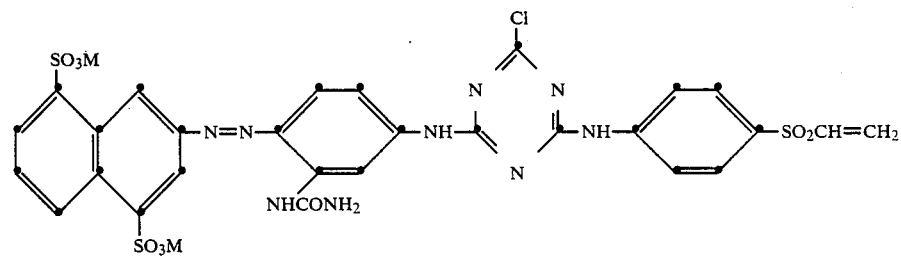
(104)

-continued
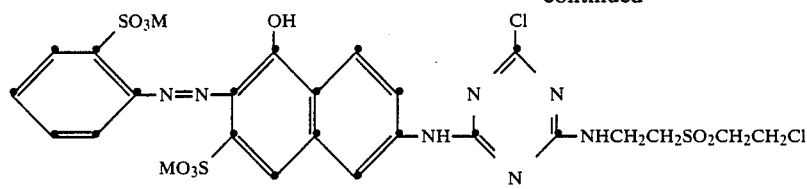(105)
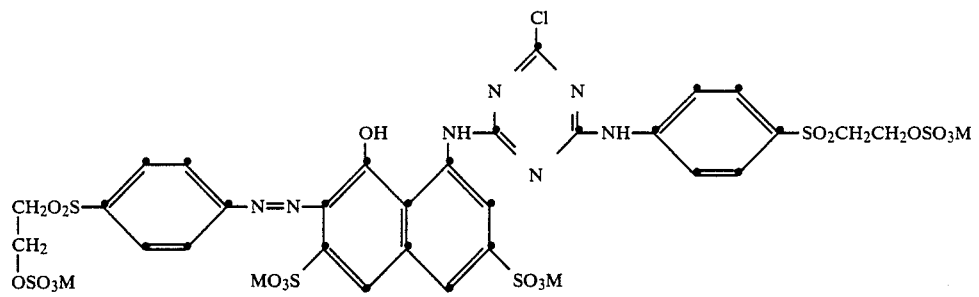(106)
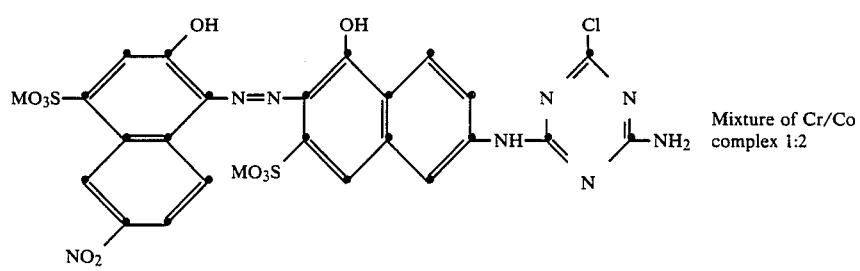(107) Mixture of Cr/Co complex 1:2
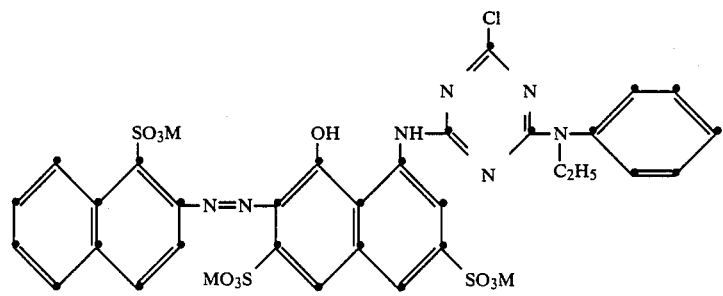(108)
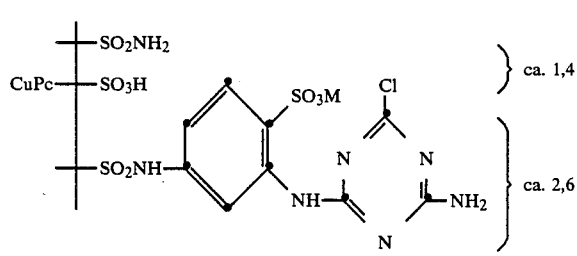(109)
(CuPc = copper phthalocyanine)
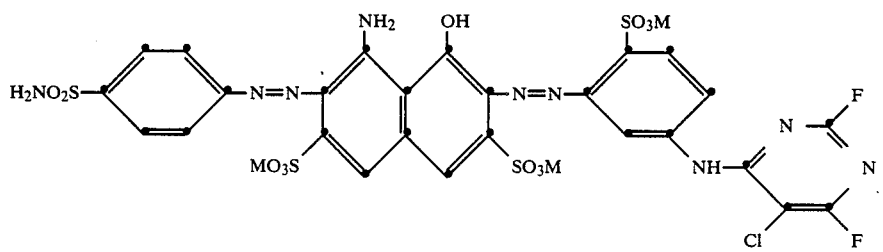(110)

EXAMPLE 2

950 g of press-cake of an asymmetric 1:2 chromium complex dye, present in the potassium and sodium form (ratio 1:1), of the formula

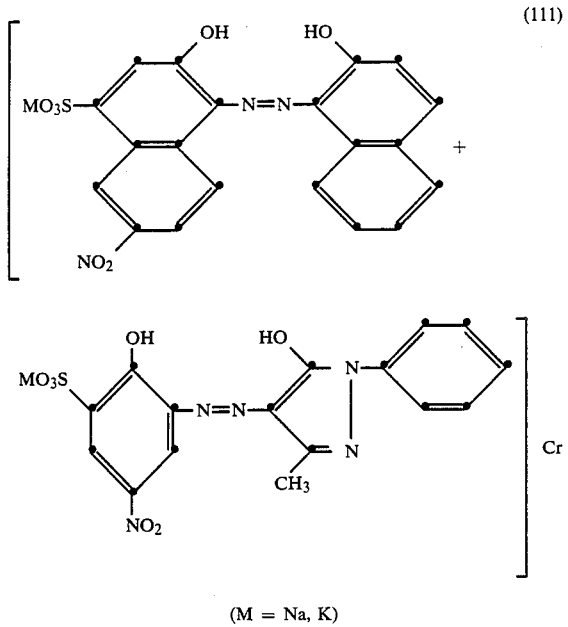

(111)

(M = Na, K)

are dissolved in 7 l of deionized water, with stirring. A solution with a dry solids content of 7.0% and an NaCl/KCl content of 1.4% is obtained.

This solution is first subjected to diafiltration with 10.5 l of water down to a salt content of about 0.1% on a reverse osmosis unit according to Example 1 under a pressure of 40 bar. The average membrane flow is 950 l/m²xd. 0.75 of 30% sodium chloride solution is then added to the dye solution and diafiltration is carried out again with a further 14 l of water down to a salt content of less than 0.1%. Subsequent concentration to a dry solids content of 25% (Na/K ratio 10:1) gives a concentrated solution which can be used to prepare a dye solution for commercial use.

EXAMPLE 3

2 kg of press-cake of the anionic dye, in the potassium and sodium salt form, of the formula

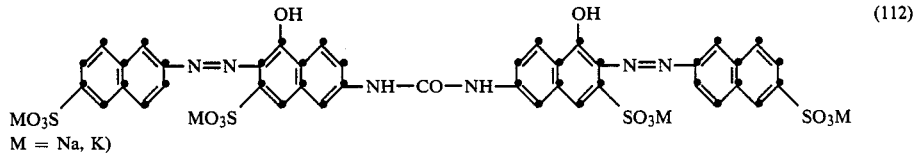

(112)

M = Na, K)

are dissolved in 15 l of deionized water, with stirring. After addition of 5 g of ethylenediaminetetraacetic acid, a dye solution with a dry solids content of 6.5% (NaCl/KCl content: 1.5%) and a pH of 7.2 is obtained.

The solution is subjected to diafiltration on a reverse osmosis unit of 0.125 m² area and containing sulfonated polysulfone membranes using 18 l of deionized water, until the salt content is about 0.2%. 2 l of 30% sodium chloride solution are then added and diafiltration is carried out again with a further 30 l of softened water. When a salt content of less than 0.1% is reached, the dye solution is concentrated to a dry solids content of 29% and can then be used to prepare a formulation for commercial use.

What is claimed is:

1. A process for the preparation of a concentrated aqueous dye formulation of an anionic dye, which comprises adding a sodium salt of a mineral acid or lower organic carboxylic acid and optionally other customary additives to an aqueous crude dye solution or suspension which contains inorganic salts and in which the anionic dye is present at the potassium, sodium/potassium or ammonium/potassium mixed salt, and desalinating and concentrating the solution or suspension by means of a membrane separation process.

2. A process according to claim 1, wherein a sodium halide, sodium carbonate, sodium sulfate, sodium phosphate or sodium salt of a lower organic carboxylic acid with 1 to 5 carbon atoms is used as the sodium salt.

3. A process according to claim 1, wherein sodium chloride, preferably as an aqueous solution, is added to the dye solution before or during the membrane separation process.

4. A process according to claim 1, wherein 5 to 200% by weight of the sodium salt, based on the weight of the dye, is added to the crude dye solution.

5. A process according to claim 1, wherein the membrane separation process is carried out in several stages and the sodium salt is added after the first stage and optionally after further stages.

6. A process according to claim 1, wherein the crude dye solution is obtained from a dye synthesis suspension by dilution with water or the crude dye suspension is obtained by suspending a dye press-cake in deionized water or aqueous sodium hydroxide solution.

7. A process according to claim 1, wherein the crude dye solution or suspension has a pH in the range from 4 to 10.

8. A process according to claim 1, wherein the anionic dye is a reactive dye.

9. A process according to claim 1, wherein the membrane separation process is carried out in several stages and the sodium chloride is added after the first stage and optionally after further stages.

* * * * *